United States Patent
Aslanidis et al.

(10) Patent No.: US 6,674,359 B1
(45) Date of Patent: Jan. 6, 2004

(54) METHOD OF IDENTIFYING SEVERAL TRANSPONDERS

(75) Inventors: Konstantin Aslanidis, Dachau (DE); Simon Atherton, Unterwattenbach (DE); Adolf Baumann, Zenting (DE); Thomas Flaxl, Dachau (DE); Andreas Hagl, Dachau (DE)

(73) Assignee: Texas Instruments Incorporated, Dallas, TX (US)

( * ) Notice: Subject to any disclaimer, the term of this patent is extended or adjusted under 35 U.S.C. 154(b) by 576 days.

(21) Appl. No.: 09/632,175

(22) Filed: Aug. 3, 2000

(51) Int. Cl.$^7$ ................................................ H04Q 5/22
(52) U.S. Cl. ..................... 340/10.31; 342/51; 375/1; 340/825.21; 380/34
(58) Field of Search ................... 340/825.54, 572, 340/51, 825.21, 10.31; 342/457, 505, 51, 42, 44; 375/1; 380/34

(56) References Cited

U.S. PATENT DOCUMENTS 4,471,345 A * 9/1984 Barrett, Jr. .................. 340/572
5,365,551 A * 11/1994 Snodgrass et al. ............ 375/1
5,686,902 A * 11/1997 Reis et al. ............... 340/825.54

FOREIGN PATENT DOCUMENTS

FR              0831618        *  3/1998 ............ G06K/7/00

* cited by examiner

Primary Examiner—Brian Zimmerman
Assistant Examiner—M Shimizu
(74) Attorney, Agent, or Firm—Wade James Brady, III; Frederick J. Telecky, Jr.

(57) ABSTRACT

Transponders present in an interrogation zone can be identified by an interrogator by it sending an RF interrogation signal into the interrogation zone, the RF interrogation signal containing a code string prompting the transponders to generate partial addresses. As soon as one transponder "sees" that the generated partial address agrees with part of its own address, it responds by sending its full address which can then be read by the interrogator. Immediately after having received a full address the interrogator sends a code string characterizing the address of the transponder having responded before so that this transponder is thereby addressable. The signal sent by the interrogator to the transponder with this code string also contains an instruction which prompts the transponder to assume the condition in which it no longer responds to receiving its address or partial address.

3 Claims, 2 Drawing Sheets

Figure 1:
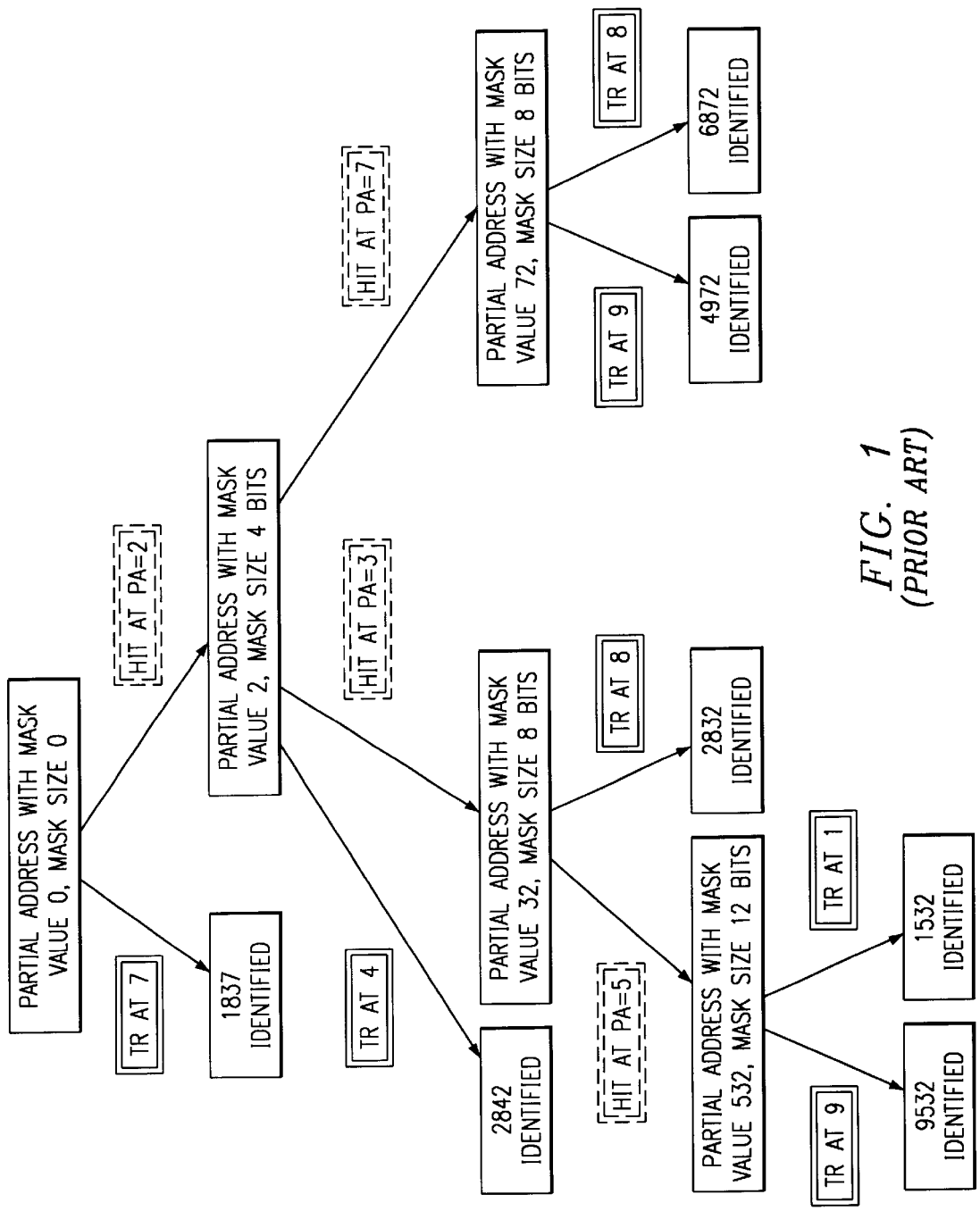

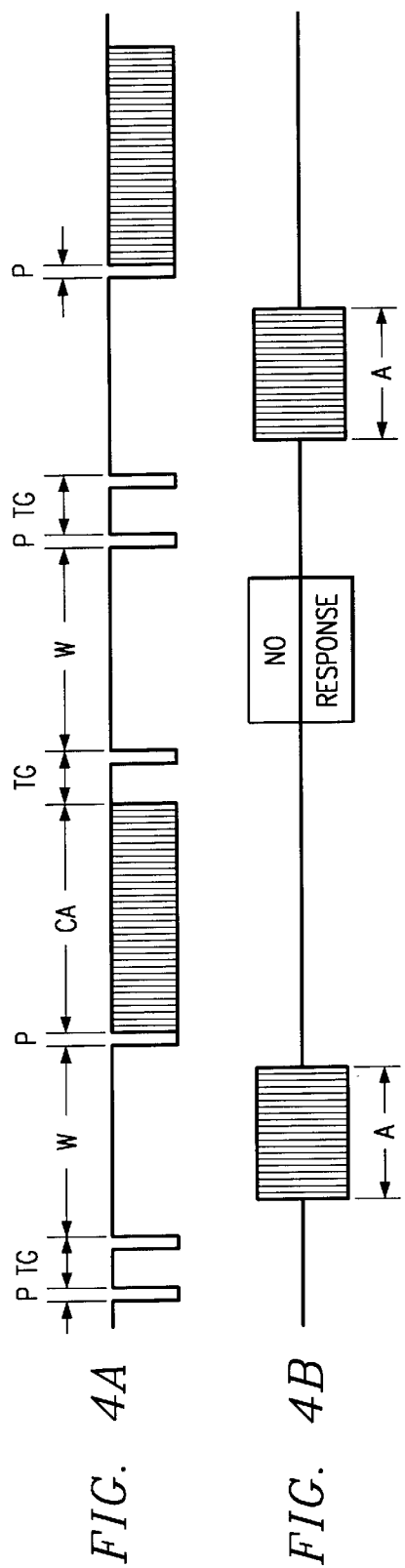
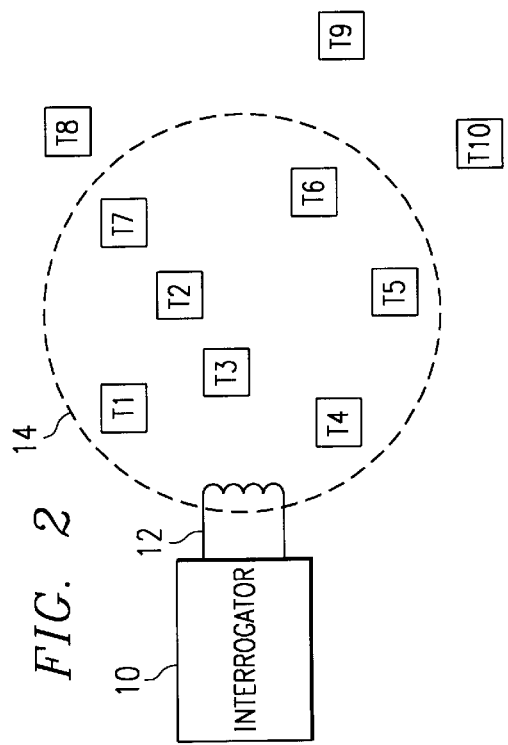
FIG. 2
FIG. 3
FIG. 4A
FIG. 4B

METHOD OF IDENTIFYING SEVERAL TRANSPONDERS

The invention relates to a method of identifying several transponders located in the interrogation zone of a reader.

More and more applications materialize in which transponders are used for identifying persons, animals or objects. Stored in these transponders is an identification code in the form of an address containing for example 32 or 64 bits which is the ID of the transponder carrier. In addition, data may be stored in the transponder containing specific information as to the carrier of the transponder. A transponder suitable for such purposes is described for example in EP-B-0 301 127, the specific feature of which is that it has no supply voltage source of its own, it instead generating its energy needed for sending the information and data contained therein from an RF interrogation pulse which it receives from an interrogator. The interrogator sends the RF interrogation pulse every time it wishes to retrieve information and data stored in a transponder existing in the interrogation zone. On receiving the RF interrogation pulse the transponder responds by sending the information and data stored therein.

In more sophisticated transponder systems the interrogator sends an RF interrogation pulse not only so that a transponder in the interrogation zone responds but it is desired to address the transponders present in the interrogation zone individually, i.e. to also send their address from the interrogator so that only the transponder responds whose address agrees with the address sent by the interrogator. This makes it necessary for the interrogator to know, however, which transponders exist in the interrogation zone. Since the range of possible addresses and thus the number of transponders belonging in all to the transponder system is very high, it possibly amounting to several millions, for example, it is of course totally out of the question that the interrogator sends all the addresses one after the other and then waits to see whether a transponder responds. The time needed for this would be prohibitively long, so that such a system would be totally useless for many applications. When it is assumed, for example, that the transponders are located on objects moving past a reader on a flow line conveyor, then the reader needs to "see" relatively quickly which transponder is in its interrogation zone at the time so that it can address these transponders explicitly and retrieve the information and data stored therein. It is thus very important to identify all transponders existing in the interrogation zone of the reader as quickly as possible.

One known method with the aid of which this identifying can be implemented quickly and reliably is described in EP-A2-0 831 618. Referring now to FIG. 1 the following is a brief discussion of how this known identification method works.

In every interrogation step the interrogator sends an RF interrogation signal which is made use of by the transponders existing in the interrogation zone—among other things—to generate the supply voltage needed for their operation. The first RF interrogation signal sent also includes a, partial address containing 4 bits in the example described, this partial address having the value zero. These 4 bits may be, for example,,the four least significant bits of the full transponder address totalling 32 or also 64 bits. The transponders are configured so that they send their response signal when the partial address received by them corresponds to the partial address in the full address stored therein. Thus, when, as in the assumed case, the partial address sent by the interrogator has the value zero, then all transponders in the interrogation zone whose least-significant 4 bits likewise have the value zero would respond. In the example as shown in FIG. 1 no such transponder exists in the interrogation zone, this resulting in the interrogator incrementing the partial address by one step and sending an RF interrogation signal accompanied by the partial address having the value 1. For this case too, it is assumed in the example that no transponder exists in the interrogation zone in which the last 4 bits of its address have the value 1.

In the next step in interrogation the partial address sent by the interrogator is incremented to the value 2. In the interrogation zone as shown in FIG. 1 as the example two transponders exist whose 4 least-significant bit have the value 2. This results in these two transponders sending back at the end of the interrogation signal their response signal to the interrogator, this response signal containing the full address of the two transponders involved. However, the interrogator is unable to distinguish these two addresses, it instead merely being able to "see" that more than one transponder was present with the corresponding address since it received an unreadable response signal hash. The interrogator memorizes the fact that the partial address 2 produced a hit, it then continuing to increment and send the partial address in its value consecutively. After sending the partial address with the value 7 a transponder responds, the reader in this case being able to read the complete transponder address so that in this sequence cycle of the first partial address the address of a transponder has been identified. This is evident from FIG. 1, whereby the value 1837 is cited, for example, as the full address, i.e. the last number 7 agreeing with that of the partial address sent by the interrogator, it being this partial address that prompted the return of the full transponder address.

As mentioned, the reader has memorized that several transponders responded to sending the partial address with the value 2. To identify the full address of these two transponders the value of the partial address having resulted in the hit is used as a mask to which a partial address of 4 further bits is added. The mask has the effect that the 4 bits of the transponder address previously compared to the partial address are "masked", i.e. concealed so that it is not these but the next 4 bits of the transponder address that are compared to the new partial address. The identification procedure is then continued, the mask having the value 2 in each case, whilst the added partial address runs through the sequence of values 0 to 15. In the example as shown in FIG. 1 a new hit occurs with the partial address having the value 3, whereas at value 4 only one transponder responds so that its address can be identified by the reader. Since the mask has the value 2 and the partial address at which the transponder responded had the value 4 the last two values of the full transponder addresses are the values 2 and 4 as evident from FIG. 1. A hit likewise occurs at the partial address value 7, as evident from FIG. 1, so that the interrogator memorizes that hits having occurred at partial address value 3 and partial address value 7. These hits need to form the basis of the further interrogation procedures in identifying the transponders involved.

The interrogator now knows that at least two transponders exist in which the mask value 2 and the partial address value 3 are involved. At least two further transponders exist in the interrogation zone which have the mask value 2 and the partial address value 7. This means, in one case, that the transponders have the value 32 at the end of their full addresses and, in the other case, the value 72. The combination of the mask used before and the partial address causing the hit forms for the new interrogation cycle a new mask totalling eight bits, whereby the mask value, in one case, amounts to 32 and, in the other case, to 72. In the subsequent consecutive interrogation procedures the new partial address is incremented in its value from 0 to 15. After sending an RF interrogation signal having the corresponding partial address it is again detected whether one or more transponders respond in the interrogation zone. As evident from FIG. 1 a transponder responds at the partial address value 8 so that this transponder can be identified from the address it sends back. Partial address value 5 again produces a hit, meaning that in the interrogation zone several transponders exist whose address matches the mask value 32 and the partial address 5.

In further testing for hits for the partial address value 7 a further partial address is added to the mask value 72, this partial address being likewise incremented from 0 to 15. As evident from FIG. 1 only one transponder responds in each case for partial address 8 and partial address 9 so that their addresses can be identified from the signal sent back by them.

The last hit still to be resolved for the partial address 5 at mask value 32 makes use of this partial address together with the mask used before, as the new mask so that the mask value is 532 and a new partial address is added, the value of which is again incremented from 0 to 15. Only one transponder responds in each case for both the partial address 1 and the partial address 9 so that their addresses too, can be identified. No further transponders exist in the interrogation zone since no further hits have occurred.

When making use of this known method it may happen that two or more transponders respond at the same time to an RF interrogation signal in the interrogation zone of the interrogator without this being read as a hit by the reader. The reason for this may be that the transponders are located differingly remote from the reader so that, for example, the transponder located very near to the reader strongly predominates by its response so that the responses of the transponders located further away are received so weakly that they are unable to swamp the strongly received response. To solve this problem it is provided for in the known method to senda signal—after having identified all transponders existing in the interrogation zone—to all identified transponders in making use of their addresses which puts them in the condition in which they do not output their response signal even when having received an address directed thereto. Once the identified transponders have been practically muted, a complete identification procedure can then be recycled in which also the previously "overheard" transponders can be detected.

However, this procedure of muting the transponders necessitates sending the full transmission message to each and every transponder identified which, in addition to the 32 or 64 bit address, also needs to include a start bit string, label, control characters, parameters, a check bit string and an end bit string. This procedure takes up a lot of time, relatively, which makes it impossible to use in all cases in which a relatively high number of transponders are located only briefly in the interrogation zone of the reader.

To speed up the identification procedure a method may be put to use as known from EP-A1-0 919 943. In this method the interrogator does not send one partial address after another to the interrogation zone, instead special measures are taken to ensure that the partial addresses are generated in the transponders and compared to the addresses actually stored in the transponder. For generating the partial addresses each transponder contains a counter whose capacity corresponds to the number of possible partial addresses. This counter is incremented one step at a time when the RF interrogation signal sent by the reader, which is made use of to generate the supply voltage in the transponders, is briefly interrupted. After every interruption pulse of this signal the counter thus has a certain count representing a partial address. In a comparator this count is compared to the address stored in the transponders, the transponder then sending back its response signal to the reader only when agreement has been found. This method avoids the time otherwise needed when the interrogator needs to implement every time a full addressing procedure in sending the full data message as needed for sending a transponder partial address to the interrogation zone.

The invention is based on the object of defining a method of the aforementioned kind with the aid of which the addresses of all transponders existing in the interrogation zone can now be speedily and reliably identified.

In accordance with the invention this object is achieved in that the interrogator sends the at least one pulse for incrementing to the next partial address in sequence in the transponder directly on timeout of a time period in which the interrogator is waiting for a transponder response when it has received no transponder response, whilst when having received a transponder response it sends an RF interrogation signal containing a signal section to be recognized by the responding transponder as a code string characterizing its address and a data section, and it not being until thereafter that it sends at least one pulse activating the incrementation tothe next partial address in sequence, and that in the data section an instruction is sent to the responding transponder which places it in the condition in which on receiving an RF interrogation signal containing its address does not react by sending its response signal.

When in implementing an identification procedure a transponder existing in the interrogation zone of the interrogator is identified, meaning that the interrogator has read the full address of the responding transponder, it is now no longer necessary for the interrogator in muting the transponder to send a full RF interrogation signal containing the complete address and a muting instruction to the transponder, it instead being sufficient to send a code string identifying the transponder address and is thus also interpretated by the transponder. The transponder thus "sees" itself addressed on receiving this code string and reacts to the muting instruction by changing into a resting status. It is in this way that a lot of time can be saved, especially when many transponders need to be signalled into the resting status, since having to send the complete RF interrogation signal is now avoided.

Advantageous further embodiments of the invention are characterized in the sub-claims.

The invention will now be detained by way of an example with reference to the drawing in which:

FIG. 1 is a schematic illustration of the sequence in an identification procedure in accordance with prior art, FIG. 2 is a schematic illustration of a transponder system in which the identification method in accordance with the invention is put to use, FIG. 3 is a schematic illustration of the contents of a full RF interrogation signal sent by the interrogation signal and FIG. 4 is a time plot helping to explain the principle sequence of the identification method in accordance with the invention.

Referring now to FIG. 2 there is illustrated a transponder system comprising an interrogator 10 which sends by means of an antenna 12 RF interrogation signals into a spatially defined interrogation zone 14, indicated in FIG. 2 by a broken line circle. This interrogation zone materializes from the fact that the interrogator 10 sends only at a relatively low power so that accordingly only a defined zone also exists in which the RF interrogation signal can be received by the transponders with adequate strength. In FIG. 2 seven transponders T1 to T7 exist in the interrogation zone 14, these transponders being capable of receiving the RF interrogation signal with sufficient field strength so that they can react thereto accordingly. Three further transponders T8 to T10 are located outside of the interrogation zone 14 so that they cannot be detected in this given spatial arrangement.

Referring now to FIG. 3 the contents of the RF interrogation signal sent by the interrogator 10 are evident. The signal usually begins with a code string characterizing the start of the signal to be transmitted. This code string is usually made use of as the start string and consists of 5 bits. Following this code string are 8 flag bits, this being followed in turn by the transponder address consisting of 32 or also 64 bits. Following this in transmission are 8 instruction bits which may be followed by up to 12 instruction parameters. In addition 0 to 64 data bits may follow the instruction parameters. Also transmitted is a check code making use of 16 bits generated by the check sum method from all of the bits of the interrogation signal and usually termed cyclic redundancy check (CRC). The last code string transmitted is an end string of 4 bits characterizing the end of the signal.

When, in making use of the identification method as described in conjunction with FIG. 1, the interrogator 10 has received a transponder response, then this response has already informed the interrogator as to the full address of the transponder. It has also received with the response signal the CRC check code string from the transponder which in generating this code string used the same algorithm as the interrogator. In addition to sending its response signal the responding transponder is in a condition in which it is ready to receive further RF signals. The transponder is thus able to receive an instruction sent by the interrogator which places it in the resting status. However, so that only this transponder reacts he resting status instruction, the signal sent by the interrogator must of course contain a signal section identifying the address of the responding transponder, since it is only when this is assured that it is certain that only this transponder reacts to the muting instruction.

As already explained in detail above with reference to FIG. 1, in identifying the transponders partial addresses are generated and a transponder will already respond when the generated partial address agrees with a corresponding section of its full address. When, for instance, the interrogator has prompted the four least-significant bits of the partial address relating to the full address to be generated in the transponder, and the transponder has detected agreement in this address section, then it responds by sending its full address which is received by the interrogator. The interrogator now knows that this transponder is contained in the interrogation zone 14. Now, in identifying further transponders, it does not immediately prompt the next partial address to be generated, which could possibly agree with partial addresses of other transponders, it instead sending the remaining bits of the address of the detected transponder, i.e. less the bits of the partial address, together with an instruction resulting in the transponder being muted. The transponder that has just responded will thereby "see" that the received remaining address together with the already generated partial address corresponds to its full address so that it reacts accordingly to the instruction and assumes the resting status.

Sending the remaining address takes up much less time than a complete addressing procedure which would necessitate sending the complete RF interrogation signal as shown in FIG. 3.

It is not until this transponder has been signalled into the resting status that the interrogator sends a code string serving as a trigger signal TG which prompts the transponders remaining in the interrogation zone to generate the next partial address. This signal is the trigger signal TG sent at the end of each complete RF interrogation signal, made up of 4 bits. However, use may also be made of simply an ID pulse for this purpose which is followed by a pulse pause of a predetermined duration.

Instead of sending the remaining address together with the muting instruction the check code string CRC can also be sent to the transponder having previously responded by returning its complete address. This transponder has namely sent this check code string CRC directly prior together with its address so that it recognizes it as part of the signal sent by the interrogator belonging to its address and reacts to the muting instruction by assuming the resting status.

Referring now to FIG. 4 there is illustrated a time plot illustrating schematically a section of an identification procedure, on the one hand, for the case of a transponder response being received and, on the other, for the case of no transponder response being received.

In an identification procedure it is always the case that the interrogator sends a pulse P at the start of the RF interrogation signal sent specially for this case, this pulse being interpreted in the transponders as a sync pulse. Immediately following this pulse P is the trigger signal TG which prompts the transponders to generate a partial address. As evident from FIG. 4 at A this energy pulse string is followed by a waiting period W in the course of which the interrogator waits to receive the transponder response. As evident from FIG. 4 at B a response signal A is sent from a transponder in the present example in this waiting period and received by the interrogator. As already mentioned, this response signal contains the full transponder response and a CRC check code string generated from this address.

In the interrogator a new identification procedure is now initiated, commencing with sending the pulse P. This is followed by the interrogator sending a code string CA identifying the address received previously from the transponder. As already mentioned this code string CA is the remaining address or the CRC check code string likewise received previously. In addition, this code string CA contains the muting instruction which prompts the transponder to assume the resting status. As soon as this code string CA has been sent, the interrogation signal sends the energy pulse string EOF which prompts all transponders still to assume the resting status to generate the next partial address in sequence. This energy pulse string EOF is followed by a further waiting period W, in the course of which no transponder response is received, however, in the example as shown in FIG. 4, because no transponder exists in the interrogation zone 14 having an addresse section agreeing with the newly generated partial address. On timeout of the waiting period W the interrogator again generates the pulse P and it sends immediately following this pulse the energy pulse string EOF which prompts the next partial address in sequence to be generated in the transponders.

The factor decisively speeding up identifying in the method as described is that the time period in which the signal CA is sent from the interrogator to the transponder to be signalled into the resting status can be maintained very short since now in this period not a complete RF interrogation signal, as shown in FIG. 3, but merely a code string identifying the address of the responding transponder needs to be sent which is short as compared to this complete signal.

Once, in the course of the interrogation procedures, all transponders existing in the interrogation zone 14 have been identified and signalled into the resting status, the interrogator again implements a full interrogation cycle which as a rule takes up only very little time since actually no further transponder should be there to respond. Should a further transponder response still be received, however, due to a hit not having been recognized for the reasons as described above in the previous identification cycle, then this transponder too can also be identified, after which the addresses of all transponders existing in the interrogation zone 14 have been reliably identified.

The method as described above takes up so little time that it may also be be put to use successfully when a larger number of transponders exists in the interrogation zone 14. For example, it is sufficient to merely transmit the 16 bit check code string CRC for a 64 bit address. In addition, identifying is also possible when the transponders are moving relating to the interrogator so that a specific number of transponders exists in the interrogation zone 14 only temporarily.

What is claimed is:

1. A method of identifying several transponders located in the interrogation zone of an interrogator, comprising the steps of:

provinging an interrogator and a plurality of transponders in an interrogation zone for the interrogator, each transponder including an incrementable device for generating a partial address and having a predetermined capacity;

sending an RF interrogation signal from the interrogator to the transponders, the RF interrogation signal containing energy pulses for generating a supply voltage in the transponders, causing the transponders to generate a partial address;

comparing the partial address in each of the transponders with a unique address stored in each transponder with a transponder having said unique address corresponding to said partial address sending a response to the interrogator and a data message having an address uniquely identifying that transponder;

responsive to having received a transponder response, the interrogator sending an RF response signal containing a signal section to be recognized by the responding transponder as a code string characterizing its address and a data section;

sending in the data section an instruction to the responding transponder which places it in the condition in which on receiving an RF interrogation signal containing its address it does not react by sending its response signal; and then, upon failure to receive a response from a transponder, sending an RF interrogation signal from the interrogator on timeout of a time period during which the transponder is waiting for a transponder response for implementing an identification procedure by the interrogator containing at least one pulse which is used in the transponders to increment the partial address in the transponders in sequence, each transponder reacting by sending a signal in response to the partial address generated therein only when the partial address agrees with a corresponding section of its address.

2. The method as set forth in claim 1, characterized in that the remainder of said address after cutting off said partial address is said code string characterizing said address of said responding transponder.

3. The method as set forth in claim 1, characterized in that a check code string contained in said RF response signal is said code string, characterizing said address of said responding transponder, this check code string agreeing with a check code string formed in said transponder when sending its response signal.

* * * * *